United States Patent
Zatzarinni et al.

(10) Patent No.: US 11,295,463 B2
(45) Date of Patent: Apr. 5, 2022

(54) METHODS, SYSTEMS, ARTICLES OF MANUFACTURE, AND APPARATUS TO ENHANCE IMAGE DEPTH CONFIDENCE MAPS

(71) Applicant: Intel Corporation, Santa Clara, CA (US)

(72) Inventors: Rony Zatzarinni, Haifa (IL); Moran Klein, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/912,365

(22) Filed: Jun. 25, 2020

(65) Prior Publication Data

US 2020/0327686 A1     Oct. 15, 2020

(51) Int. Cl.
*G06T 7/50*     (2017.01)
*G06T 7/13*     (2017.01)
*G06K 9/62*     (2022.01)

(52) U.S. Cl.
CPC .............. *G06T 7/50* (2017.01); *G06K 9/6202* (2013.01); *G06T 7/13* (2017.01); *G06T 2207/10028* (2013.01); *G06T 2207/20084* (2013.01)

(58) Field of Classification Search
CPC ... G06T 7/50; G06T 7/13; G06T 2207/10028; G06T 2207/20084; G06K 9/6202
See application file for complete search history.

(56) References Cited

U.S. PATENT DOCUMENTS

| | | | |
|---|---|---|---|
| 8,977,038 B2 * | 3/2015 | Tian | H04N 13/246 |
| | | | 382/154 |
| 9,519,972 B2 * | 12/2016 | Venkataraman | G06T 1/20 |
| 10,122,994 B2 * | 11/2018 | Yucer | H04N 13/232 |
| 10,462,445 B2 * | 10/2019 | Javidnia | H04N 13/271 |
| 10,574,905 B2 * | 2/2020 | Srikanth | G06T 7/11 |
| 10,930,054 B2 * | 2/2021 | Zhang | G06T 5/005 |
| 2020/0327686 A1 * | 10/2020 | Zatzarinni | G06K 9/4609 |

OTHER PUBLICATIONS

Hu et al., "A Quantitative Evaluation of Confidence Measures for Stereo Vision", IEEE Transactions on Pattern Analysis and Machine Intelligence, vol. 34, No. 11, Nov. 2012, (13 pages).

Larry Matthies., "Stereo vision for planetary rovers: stochastic modeling to near-real-time implementation," Geometric Methods in Computer Vision, 1991 (15 pages).

(Continued)

*Primary Examiner* — Gregory M Desire
(74) *Attorney, Agent, or Firm* — Hanley, Flight & Zimmerman, LLC

(57) ABSTRACT

Methods, systems, articles of manufacture, and apparatus to enhance image depth confidence maps are disclosed. An apparatus includes a gradient analyzer to: generate an image gradient based on a digital image of a scene; and generate a depth gradient based on a depth map associated with the digital image. The depth map is to define depth values corresponding to pixels in the digital image. The apparatus further includes an enhanced confidence map analyzer to determine an enhanced confidence map for the depth map based on the image gradient, the depth gradient, and an initial confidence map for the depth map.

36 Claims, 10 Drawing Sheets

(56) References Cited

OTHER PUBLICATIONS

Egnal et al. "A stereo confidence metric using single view imagery with comparison to five alternative approaches," Image and Vision Computing, vol. 22, pp. 943-957, 2004 (15 pages).

Park et al., "Leveraging Stereo Matching with Learning-based Confidence Measures," IEEE Conference on Computer Vision and Pattern Recognition, 2015 (9 pages).

Poggi et al., "Learning a general-purpose confidence measure based on O(1) features and a smarter aggregation strategy for semi global matching," Fourth International Conference on 3D Vision, 2016 (10 pages).

Spyropoulos et al., "Learning to Detect Ground Control Points for Improving the Accuracy of Stereo Matching," IEEE Conference on Computer Vision and Pattern Recognition, 2014 (8 pages).

Hirschmuller, "Stereo Processing by Semiglobal Matching and Mutual Information," IEEE Transactions on Pattern Analysis and Machine Intelligence, vol. 30, No. 2, Feb. 2008, (14 pages).

Fu et al., "Stereo Matching Confidence Learning based on Multi-modal Convolution Neural Networks," 7th International Workshop of Representation, Analysis and Recognition of Shape and Motion from Image Data, 2017 (13 pages).

Poggi et al., "Learning from scratch a confidence measure," British Machine Vision Conference, 2016 (13 pages).

Seki et al., "Patch Based Confidence Prediction for Dense Disparity Map," British Machine Vision Conference, 2016 (13 pages).

Tosi et al., "Beyond local reasoning for stereo confidence estimation with deep learning," European Conference on Computer Vision, 2018 (16 pages).

Kim et al., "Deep Stereo Confidence Prediction for Depth Estimation," IEEE International Conference on Image Processing, 2017 (5 pages).

Kim et al., "LAF-Net: Locally Adaptive Fusion Networks for Stereo Confidence Estimation," IEEE/CVF Conference on Computer Vision and Pattern Recognition (CVPR), 2019 (10 pages).

Zhang et al., "ActiveStereoNet: End-to-End Self-Supervised Learning for Active Stereo Systems," European Conference on Computer Vision, 2018 (18 pages).

\* cited by examiner

METHODS, SYSTEMS, ARTICLES OF MANUFACTURE, AND APPARATUS TO ENHANCE IMAGE DEPTH CONFIDENCE MAPS

FIELD OF THE DISCLOSURE

This disclosure relates generally to computer vision, and, more particularly, to methods, systems, articles of manufacture, and apparatus to enhance image depth confidence maps.

BACKGROUND

The related technical fields of computer vision, machine vision, image processing, pattern recognition, and the like, often involve the analysis of one or more images of a scene to extract features indicative of the objects within the scene and/or their spatial relationship to one another. The implementation of such technical disciplines may involve the generation of a depth map associated with the imaged scene that includes information indicative of the depth and/or distance of different surfaces of objects within the scene relative to a particular viewpoint of the image(s) being analyzed (e.g., relative to the viewpoint of the camera(s) that captured the image(s)). More particularly, a depth map defines a value representative of a depth for each pixel in an image of the scene being analyzed. The depth values for individual pixels defined in a depth map are estimations based on an analysis of the underlying image(s) of the scene. In addition to generating a depth map, many computer vision systems also generate a confidence map that defines the level of confidence of the depth values in the depth map.

Figure 1:
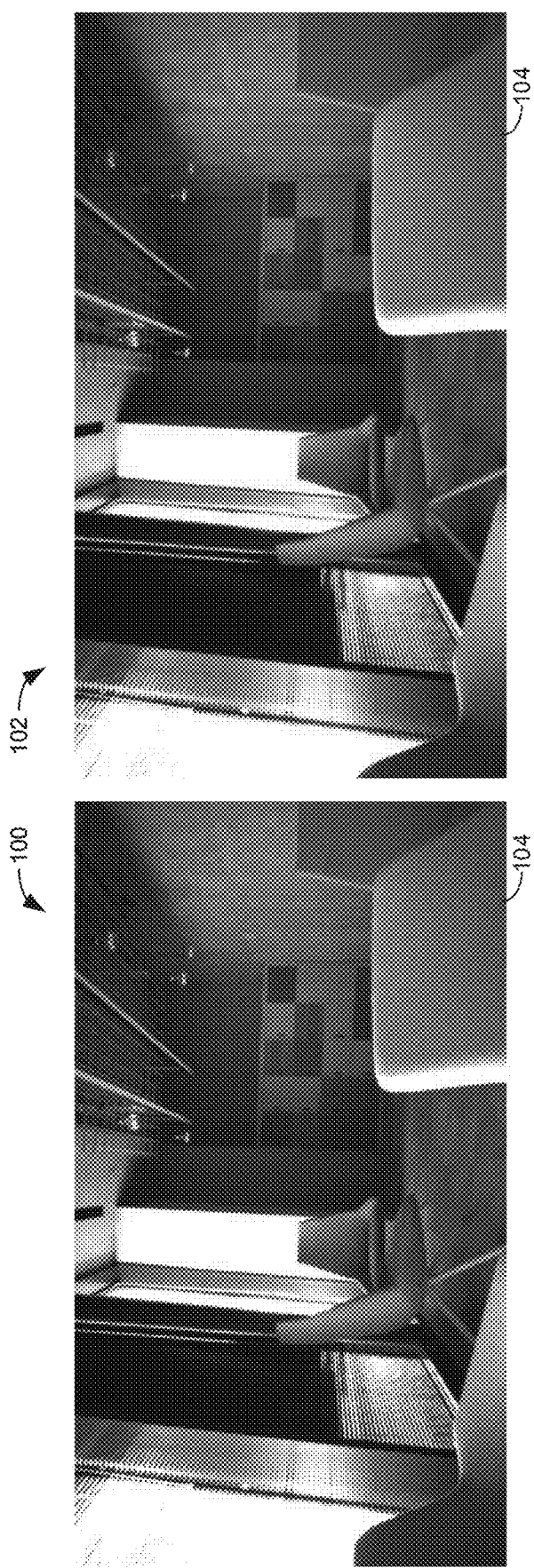
FIG. 1 shows two example rectified stereo images of a scene to be analyzed in accordance with teachings disclosed herein.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

In some computer vision applications, depth information associated with an imaged scene may be analyzed in addition to an image of the scene. In some instances, such depth information is represented by a depth map or depth image. A depth map may be represented as a two-dimensional array of data with elements corresponding to the two-dimensional array of pixels in an associated image. That is, the value of each element in a depth map corresponds to an individual pixel in the associated image. More particularly, the value of each element in the depth map indicates and/or corresponds to the depth or distance of the surface of the object in the scene represented by the corresponding pixel in the captured image relative to some reference point (e.g., the position of the sensor that captured the image).

In some situations, the depth information indicated by a depth map may be generated using one or more depth sensors. There are different types of depth sensors that may be used to generate a depth map including, for example, structured light cameras, coded light cameras, time of flight cameras (e.g., LiDAR sensors), stereo depth cameras, etc. Each type of depth sensor has its associated advantages and disadvantages. Regardless of the depth sensing technology used, there are likely to be errors in the estimated depth associated with particular pixels represented by the depth map. Accordingly, many depth sensing systems often generate a confidence map that indicates the level of confidence associated with the depth information represented by each element in a depth map. A confidence map may be represented as a two-dimensional array of data with elements corresponding to the two-dimensional array of pixels in an associated image and the corresponding two-dimensional array of elements in the associated depth map. The value of each element in a confidence map indicates a level of confidence in the estimated depth or distance represented by the value in the corresponding element in the depth map. In some instances, the values in the confidence map may be binary (e.g., either confident (a value of 1) or not confident (a value of 0)). In other instances, the values in a confidence map may be a range of values (e.g., from 0 to 255) to indicate a range of confidence levels. In either case, the confidence map may be used to filter out unreliable depth information in a depth map be excluding the depth information associated with a low confidence level (e.g., a value of 0 in a binary-based confidence map or a value that satisfies (e.g., is below) some threshold).

While a confidence map may be used to filter out unreliable depth information in a depth map, confidence maps are not perfect. Frequently, at least some portion of the depth information contained in the depth map that is correct (e.g., reflects an accurate indication of the depth or distance of the associated object represented by the corresponding pixel in the image of the scene being analyzed) may be associated with a low confidence level in the confidence map (e.g., a false negative). Likewise, at least some portion of the depth information contained in the depth map that is incorrect (e.g., reflects an inaccurate indication of the depth or distance) may be associated with a high confidence level in the confidence map (e.g., a false positive).

A specific example of a process to generate a depth map and corresponding confidence map based on stereo matching is shown in connection with FIGS. 1-4. In particular, FIG. 1 shows two rectified images 100, 102 of a scene to be analyzed (e.g., captured by stereo cameras). In this example, the left image 100 of the scene is captured from a position that is slightly to the left of the position from which the right image 102 of the scene was captured. As a result, the two images 100, 102 present slightly different perspectives or viewpoints of the scene as is apparent from the shifted position of seatback 104 in the foreground of the left image 100 relative to the seatback 104 of the right image 102. In some examples, the images 100, 102 may be grayscale images such that each pixel is associated with a single pixel value. In other examples, the images 100, 102 may be in color such that each pixel includes three subpixel values corresponding to red, green, and blue. That is, in some examples, the images 100, 102 may be RGB images.

As mentioned above, the images 100, 102 are rectified. Image rectification involves the transformation (e.g., geometric distortion) of the originally captured images so that matching pixels in the output (rectified) images 100, 102 corresponding to the same point in the scene are aligned vertically along the Y axis. That is, while matching pixels corresponding to a particular point in the scene may shift left to right (e.g., horizontally) along the X axis as between the two images 100, 102 (e.g., the shifting of the seatback 104 noted above), rectification ensures that the matching pixels do not shift vertically along the Y axis (e.g., the top edge of the seatback 104 is at the same vertical position within both the left and right images 100, 102). Image rectification facilitates the process of identifying matching pixels between the two images 100, 102 that can then be used to generate a depth map for a reference one of the images.

More particularly, the depth information represented in a depth map may be calculated based on principles of triangulation based on a known distance between the two stereo cameras that captured the two images 100, 102 and the disparity or distance between matching pixels in the two images. As used herein, the disparity between two matching pixels corresponds to the difference in the X position (e.g., the amount of shift) of matching pixels in the two images 100, 102. Generally speaking, objects in a scene that are closer to the stereo cameras will correspond to larger pixel disparities than objects farther away. In some examples, the values for elements in the depth map associated with particular pixels of an image correspond to the disparity between those pixels and the corresponding matching pixels in an associated stereo image. For this reason, depth maps are sometimes referred to as disparity maps and both terms are used interchangeably herein.

Before the pixel disparities can be calculated to generate the depth information for a depth map, corresponding ones of the pixels in each of the two images 100, 102 need to be matched. There are a variety of methodologies that may be implemented to match pixels between the two images 100, 102. Any such approach may be used in accordance with teachings disclosed herein. Many approaches to determine the correspondence or matching of pixels involves the construction of a cost volume ($cv\{R,L\}(x,y,d)$). A cost volume may be conceptualized as representing different cost values indicative of different comparisons of each pixel in one of the two images 100, 102 to different pixels in the other image at different levels of disparity. Typically, the different levels of disparity will range from the two images directly overlapping (e.g., a disparity of 0 corresponding to no shift in X-direction between the images) up to some threshold shift in the X-direction between the horizontal alignment of the two images 100, 102. Based on an analysis of the different comparisons of individual ones of the pixels at different disparities, the particular disparity that reduces (e.g., minimizes) a particular cost function (e.g., based on similarity) is used as an estimate of the true disparity and the pixels associated with the estimate of the true disparity are determined to be matching pixels.

Figure 2:
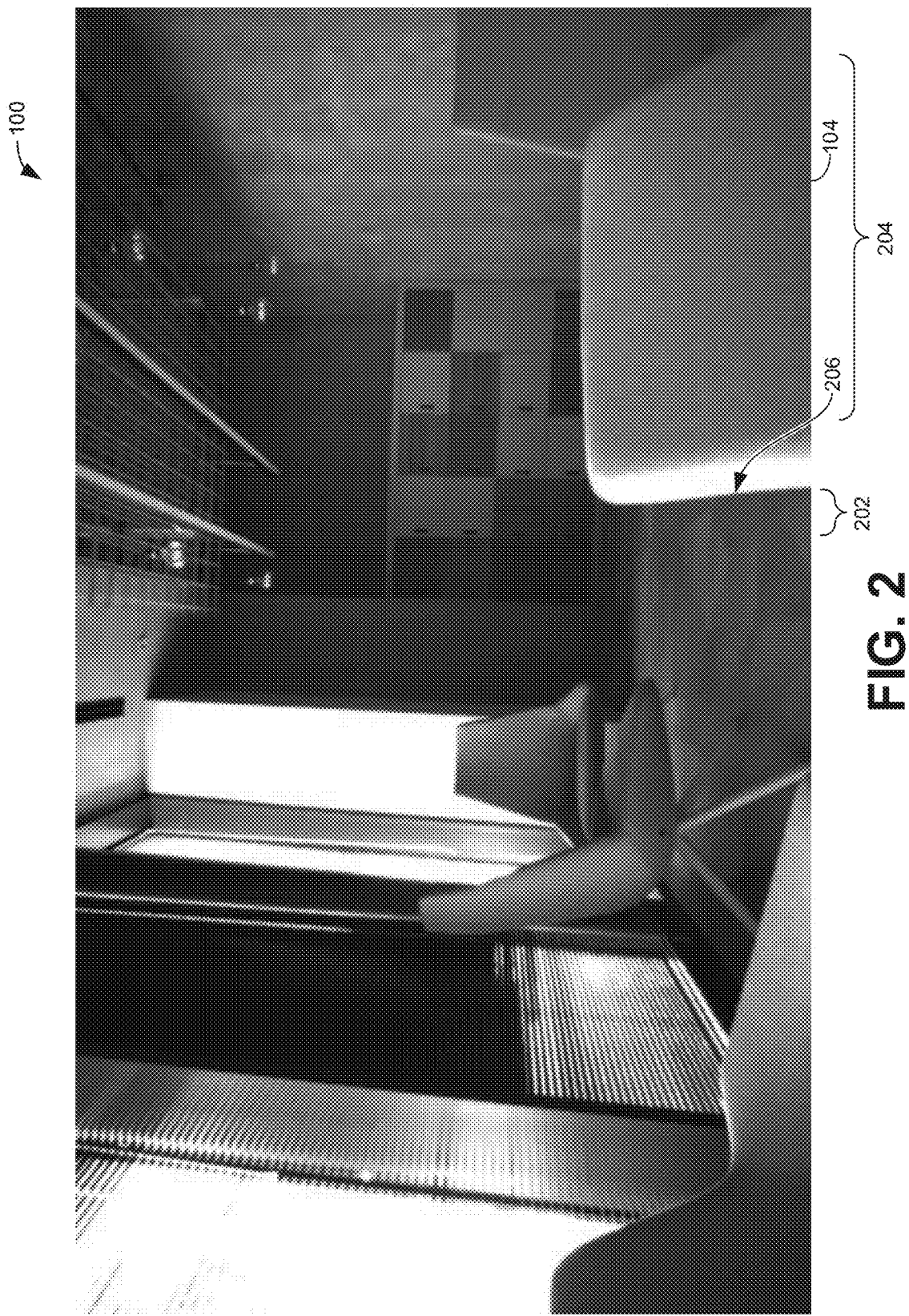
FIG. 2 is an enlarged view of the left image shown in FIG. 1.

Once two pixels have been identified as matching or corresponding to one another, the corresponding disparity (e.g., the estimate of the true disparity that was used to identify the pixels as matching) may be used to estimate the distance or depth of the object in the scene associated with the matching pixels. As mentioned above, in some instances, the values of the elements in the depth map correspond to the size of the disparity between the relevant matching pixels from which the actual distance or depth associated with the pixels may be subsequently calculated and/or derived. The depth map is generated to correspond to one of the two images, which serves as the reference image. In this example, the left image 100 of FIG. 1 is the reference image. An enlarged view of the left image 100 is shown in FIG. 2. An example depth map (or disparity map) 300, corresponding to the left image 100 of FIGS. 1 and 2, is shown in FIG. 3.

The cost values calculated for the cost volume from which a depth map is generated may also be used to generate a confidence map indicating the confidence levels for the different disparities (and/or associated depths) represented in the depth map. An example confidence map 400, corresponding to the depth map 300 of FIG. 3, is shown in FIG. 4. In this example, the confidence map 400 represents binary confidence values where low confidence (e.g., not confident) in the depth information is indicated by black and high confidence in the depth information is indicated by white.

Figure 3:
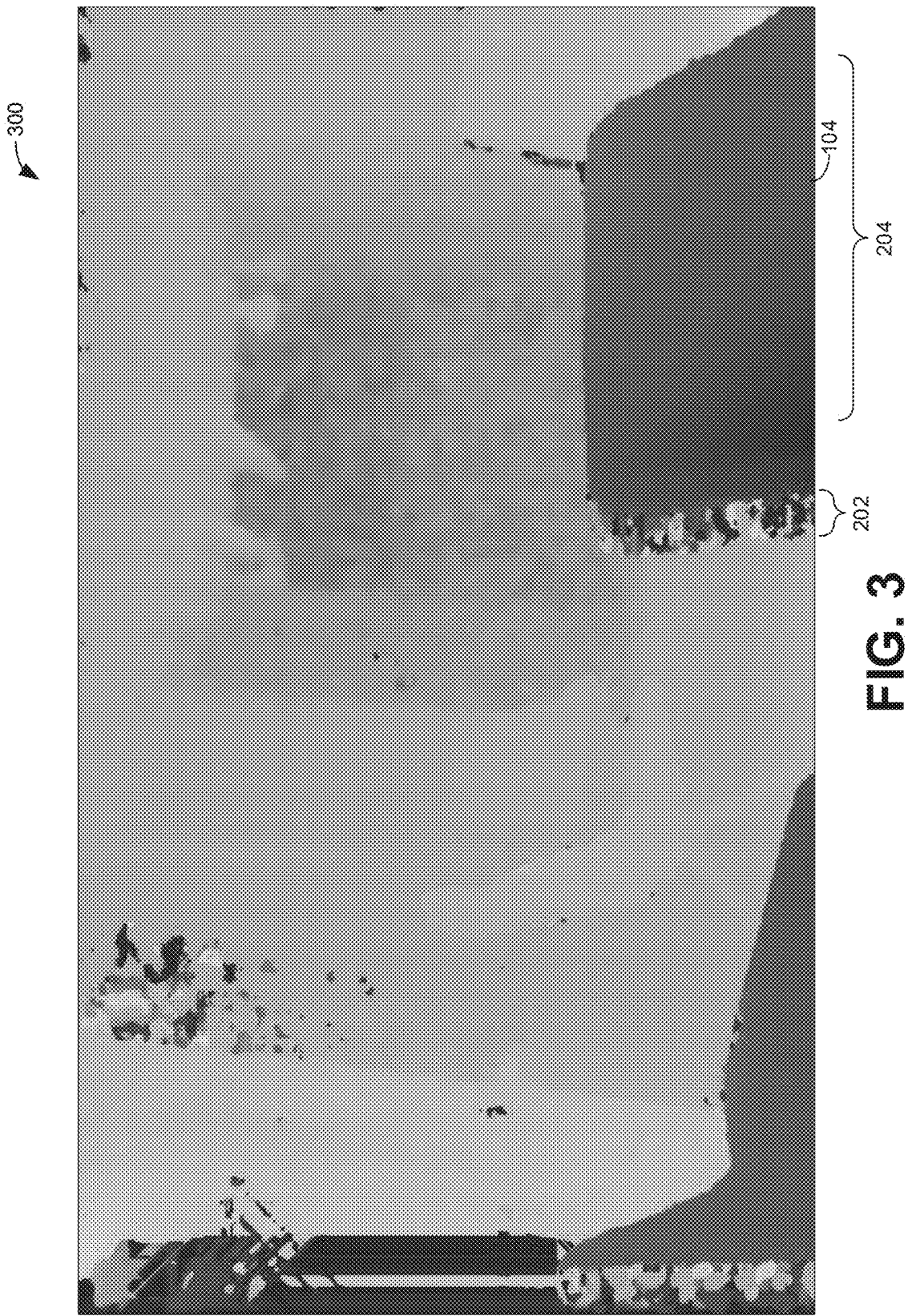
FIG. 3 is an example depth map for the left image of FIGS. 1 and 2.
Figure 4:
FIG. 4 is an example confidence map for the depth map of FIG. 3.

The depth map 300 of FIG. 3 and the confidence map 400 of FIG. 4 include many unreliable and/or uncertain data points. In some examples, the data points are unreliable when the depth information in the depth map 300 is inaccurate. In some examples, the data points are uncertain when there is a low confidence level for the data points (as indicated in the confidence map 400) regardless of whether the underlying depth information is accurate or not. More particularly, the depth information (e.g., the disparities between matching pixels) is often inaccurate and/or associated with a low confidence level along edges of objects such as the area 202 to the left of the seatback 104 shown in FIGS. 2-4. The depth information along object edges is associated with a low confidence level because portions of background object in the imaged scene next to the edge of a foreground object may be occluded by the foreground object in one of the two images 100, 102. That is, the portion of the scene associated with the area 202 in the left image 100 of FIG. 2 is not visible in the right image 102 of FIG. 1 because the seatback 104 is in the way. As a result, the pixels associated with the area 202 in the left image 100 do not actually correspond to or match any pixels in the right image 102 such that no reliable disparity can be calculated to determine the depth associated with the pixels.

Furthermore, the depth information (e.g., the disparities between matching pixels) is often inaccurate and/or associated with a low confidence level along relative flat or smooth regions such as the area 204 corresponding to the facing surface of the seatback 104 shown in FIGS. 2-4. Smooth or flat surface are associated with lower confidence levels because the consistent appearance across the surface makes it more difficult to precisely match each pixel in the left image 100 to the proper corresponding pixel in the right image 102. As a result, as shown in the confidence map 400 of FIG. 4, the area 204 across the seatback 104 includes many spots of low confidence (also referred to herein as holes or gaps in the confidence map 400) where the reliability depth information in the depth map 300 of FIG. 3 is considered to be uncertain.

While the depth map 300 of FIG. 3 and corresponding confidence map 400 of FIG. 4 were generated based on stereo matching of the two rectified images 100, 102 of FIG. 1 as outlined above, similar depth maps and corresponding confidence maps may be generated in any other suitable manner. As described above, many depth maps are generated based on matching cost volumes that involve the calculation of cost values for each possible match within the defined disparity range from a pixel in the left image 100 (IL(xL,y)) to a pixel in the right image 102 (IR(xR,y)) and/or vice versa. The confidence levels or measures of confidence based on this approach are dependent on the cost volume cues such as the minimum matching cost, the second minimum matching cost, both the minimum and second minimum matching cost, etc. Specific examples of the matching cost volumes approach to generate confidence maps includes the native peak ratio (PKRN) approach, the maximum likelihood measure (MLM) approach, and/or the left-right difference (LRD) approach.

Another approach to generating confidence maps is based on multiple different initial depth (disparity) maps. For example, a first depth map may be generated by determining disparities between pixels as the images 100, 102 are shifted relative to one another from left to right while a second depth map may be generated determining the disparities between the pixels as the images 100, 102 are shifted from right to left. In such examples, the confidence map may be generated based on a comparison of the first and second depth maps. This particular approach is referred to as the left-right consistency (LRC) approach. Other specific examples of processes to generate confidence maps based on initial depth maps include those based on the variance of the disparity values and/or the median deviation of the disparity values.

A third approach to generating confidence maps from stereo images is based on the source image pairs themselves. For example, a confidence map may be generated based on a magnitude of image gradient measures and/or based on distances of pixels to borders of the images.

Each of the above approaches to generating confidence maps may be implemented in a sequential logical manner. Additionally or alternatively, confidence maps may be generated using deep neural networks based on associated machine learning models that use inputs including one or more of the cost volumes, the depth maps, and/or the image pairs as outlined in the above example approaches. Many deep learning models are developed through supervised training in that they depend upon a ground truth confidence map defined based on a ground truth depth map as follows:

$$C_{GT}=|D_{GT}-D_{est}|<\tau \qquad \text{Eq. 1}$$

where $C_{GT}$ is the ground truth confidence map, $D_{GT}$ is the ground truth depth map, $D_{est}$ is the estimated depth map, and $\tau$ is a threshold. The machine learning model is generated by training a deep neural network to reproduce the ground truth confidence map ($C_{GT}$). Once trained, the model may be applied to new inputs (e.g., new stereo images, cost volumes, and/or depth maps) to estimate or infer an appropriate confidence map for the inputs.

Some deep learning models for estimating confidence maps may be generated in an unsupervised manner. For instance, one approach is based on a left-right consistency check in which an estimated (output) confidence map ($C_{est}$) is based on left and right estimates of the depth maps ($D_{est}^l$ and $D_{est}^r$) for an associated pair of stereo images as follows:

$$C_{est}=|D_{est}^l-D_{est}^r|<\tau \qquad \text{Eq. 2}$$

where $\tau$ is a threshold equal to 1.

While the above approaches (whether based on machine learning models or sequential logic instructions) are capable of generating reasonable estimates for confidence maps, each of the approaches is imperfect and the resulting confidence maps are likely to have errors and/or inaccuracies as outlined above. Examples disclosed herein enable the enhancement or improvement of any such confidence maps based on subsequent processing. A typical approach to improve confidence map generation is to improve the algorithm and/or sequential logic by which the cost volume is analyzed to produce the confidence map. However, many depth sensing systems process cost volumes internally and do not provide the cost volumes as an output. One reason for not providing this data is processor and memory efficiency because cost volumes contain large amounts of data that can be computationally expensive to process. Thus, enhancements to initial confidence maps through post processing are significantly limited by the technological reality that cost volume data is often unavailable. In the context of deep learning solutions to confidence map generation, improvements are possible by improving the underlying models used to estimate confidence maps. Models may be improved through better training based on accurate ground truth. However, accurate ground truth (e.g., actual depths or distances of surfaces of an imaged scene) is very difficult and/or cost prohibitive to obtain. Indeed, as noted above, some existing deep learning methodologies generate ground truth based on estimates rather than actual measured depth information. Examples disclosed herein enable the enhancement of confidence maps generated in any suitable matter through post processing without the need for cost volume data and without the need for ground truth data. That is, examples disclosed herein are able to improve any confidence map regardless of the underlying methodology used to initially generate the confidence map.

In particular, the improvements to confidence maps disclosed herein are premised on three assumptions arising out of the observation that there is a strong correlation between the image of a scene being analyzed and the depth map for the image. A first assumption is that an enhanced confidence map should be relatively close or similar to the initial confidence map. This assumption is made because the initial confidence map is based on the initial image and associated depth map. As a result, for any enhanced confidence map to correspond to the underlying image, the enhanced confidence map should be relatively close or similar to the initial confidence map. A measure of the closeness or similarity between the initial (input) confidence map and the enhanced or refined (output) confidence map may be expressed as the Euclidean norm (also known as the 2-norm) of the difference between the two confidence maps. This may be expressed mathematically as follows:

$$\|C_{out} - C_{in}\|_2 \qquad \text{Eq. 3}$$

where $C_{in}$ is the initial confidence map and $C_{out}$ corresponds to the enhanced confidence map. In some examples, the initial confidence map is provided by a depth sensing system based on any suitable approach to generate confidence maps as outlined above. In other examples, the initial confidence map may be defined independent of any associated depth sensing system. For instance, in some examples, the confidence map may be defined with all values being 1 (e.g., $C_{in}=1$) indicating that all depth information in the associated depth map is designated as reliable (e.g., confidence is assumed in the entirety of the depth map).

A second assumption to generate an enhanced confidence map is that relatively smooth regions in the underlying digital image (e.g., the left image 100 of FIGS. 1 and 2) should correspond to a relatively smooth depth in the associated depth map. Smooth regions within the image may be identified by generating a gradient of the image to identify edges (e.g., the edge of a foreground object adjacent a background object) and/or other discontinuities within the pixel information of the image. The smooth regions of an image often correspond to areas in the image gradient where the discontinuities are absent or at least relatively minor (e.g., below a threshold). Similarly, smooth regions in an associated depth map may be identified by generating a gradient of the depth map to identify any discontinuities therein. If the assumption that relatively smooth regions in the image should correspond to relatively smooth regions in the depth map is true, then regions in the depth map that contain discontinuities above a threshold (e.g., that are non-smooth) are likely to contain inaccurate depth information when associated with a smooth region in the underlying image. Isolating smooth regions in the image that correspond to non-smooth regions in the associated depth map may be accomplished by applying a first threshold function to the image gradient and a second threshold function to the depth gradient and multiplying the outputs of the two threshold functions. More particularly, in some examples, the first threshold function is a monotonic decreasing soft threshold function (to zero out non-smooth regions in the image) and the second threshold function is a monotonic increasing soft threshold function (to zero out smooth regions in the depth map).

In some examples, the values in the confidence map associated with the isolated regions of mismatching smooth and non-smooth areas in the image and depth map are reduced (e.g., set to zero or otherwise set to designate low confidence) to remove the potentially unreliable depth information in the depth map at those regions. In some examples, a measure of the above assumption may be described the Euclidean norm of the enhanced confidence map multiplied by the output of the first threshold function applied to the image gradient and the output of the second threshold function applied to the depth gradient. This may be expressed mathematically as follows:

$$\|C_{out} F_I(\Delta I) F_D(\Delta D)\|_2 \qquad \text{Eq. 4}$$

where $\Delta I$ is the image gradient of image I, $\Delta D$ is the gradient of the depth map D, $F_I$ is a monotonic decreasing soft threshold function, and $F_D$ is a monotonic increasing soft threshold function. The complementary (e.g., increasing and decreasing) threshold functions cause Equation 4 to approach 0 except for relatively smooth regions in the image (e.g., relatively small $\Delta I$) and relatively non-smooth regions in the depth map (e.g., relatively large $\Delta D$). Thus, Equation 4 may be reduced (e.g., minimized) by setting the confidence values in the enhanced confidence map ($C_{out}$) to 0 that correspond to the smooth regions in the image and non-smooth regions in the depth map.

A third assumption to generate an enhanced confidence map is that discontinuities in the confidence map will occur at locations corresponding to edges in the underlying digital image (e.g., the left image 100 of FIGS. 1 and 2). Such discontinuities occur because of occlusion of background surfaces by foreground objects (e.g., the area 202 in FIG. 2 corresponds to a region of the imaged scene in the background that is occluded by the seatback 104 in the right image 102 of FIG. 1). Discontinuities in the confidence map may be identified by generating a gradient of the confidence map. Further, relevant portions of the confidence map gradient may be associated with edges in the underlying image by multiplying the gradient of the confidence map by an output of a threshold function applied to a gradient of the image. In some examples, the Euclidean norm of this multiplication may be evaluated as expressed in Equation 5

$$\|\Delta C_{out} F_I(\Delta I)\|_2 \qquad \text{Eq. 5}$$

where $\Delta C_{out}$ is the gradient of the enhanced confidence map $C_{out}$, and $F_I$ is the threshold function applied to the image gradient $\Delta I$. In some examples, the threshold function $F_I$ in Equation 5 is the same as the first threshold function $F_I$ in Equation 4. That is, in some examples, the threshold function $F_I$ in Equation 5 is a monotonic decreasing soft threshold function.

Each of Equations 3-5 are based on the enhanced confidence map term $C_{out}$. Although this is described above as the enhanced confidence map, the term $C_{out}$ may more appropriately be considered as a matrix parameter representative of any possible solution for a confidence map. However, Equations 3-5 may be combined to define a global convex optimization problem with a single solution that provides the optimal values for the matrix parameter $C_{out}$ that reduces or eliminates holes or gaps in the initial confidence map and increases the alignment of low confidence regions in the confidence map with edges in an underlying image (e.g., the left image 100 of FIGS. 1 and/or 2). More particularly, the global optimum for the matrix parameter $C_{out}$ is defined by simultaneously reducing (e.g., minimizing) the terms in each of Equations 3-5. This may be expressed mathematically as follows:

$$C_{out} = \mathrm{argmin}_{C_{out}} \{\|C_{out} - C_{in}\|_2 + \alpha \|C_{out} F_I(\Delta I) F_D(\Delta D)\|_2 + \beta \|\Delta C_{out} F_I(\Delta I)\|_2\} \qquad \text{Eq. 6}$$

where $\alpha$ and $\beta$ are tunable parameters. Equation 6 defines a convex quadratic problem with a single optimal solution at the global minimum of the function. Thus, the optimal solution, which defines the enhanced confidence map, can be determined by determining the values for $C_{out}$ where the derivative of Equation 6 is zero:

$$\frac{d}{dC_{out}}\{\|C_{out} - C_{in}\|_2 + \qquad\qquad\qquad\qquad\qquad \text{Eq. 7}$$
$$\alpha\|C_{out}F_I(\Delta I)F_D(\Delta D)\|_2 + \beta\|\Delta C_{out}F_I(\Delta I)\|_2\} = 0$$

Equation 7 can be written in matrix notation as follows:

$$\frac{d}{dC_{out}}\{\|C_{out} - C_{in}\|_2 + \alpha\|C_{out}D_{ID}\|_2 + \beta\|C_{out}G\|_2\} = 0 \qquad \text{Eq. 8}$$

where $C_{in}$ and $C_{out}$ are column vectors, $D_{ID}$ is a diagonal matrix with values along the diagonal corresponding to the diagonal of $F_I(\Delta I)F_D(\Delta D)$, and G is a matrix defined by $$G = HD_I \qquad\qquad \text{Eq. 9}$$

where $D_I$ is a diagonal matrix with values along the diagonal corresponding to the diagonal of $F_I(\Delta I)$, and H is a derivation matrix. As used herein, the derivation matrix H is defined as a bidiagonal matrix with each element on the main diagonal being 1 and each element on the superdiagonal being −1. That is, $$H = \begin{bmatrix} 1 & -1 & 0 & 0 & \cdots \\ 0 & 1 & -1 & 0 & \cdots \\ 0 & 0 & 1 & -1 & \cdots \\ 0 & 0 & 0 & 1 & \cdots \\ \vdots & \vdots & \vdots & \vdots & \ddots \end{bmatrix} \qquad \text{Eq. 10}$$

Applying the differential in Equation 8 produces $$I^T I(C_{out} - C_{in}) + \alpha D_{ID}^T D_{ID} C_{out} + \beta G^T G C_{out} = 0 \qquad \text{Eq. 11}$$

where the I in the term $I^T I$ refers to the identity matrix (rather than the image I in the image gradient $\Delta I$ in Equations 4-7. Simplifying Equation 11 and isolating $C_{out}$ gives $$C_{out} = \frac{C_{in}}{(I^T I + \alpha D_{F_{ID}}^T D_{F_{ID}} + \beta G^T G)} \qquad \text{Eq. 12}$$

All of the terms on the righthand side of Equation 12 are either known (e.g., provided as inputs from a depth sensing system) or can be derived from known inputs. Therefore, Equation 12 can be directly evaluated to arrive at the particular values for the matrix parameter $C_{out}$ that define the enhanced confidence map as described above.

Figure 5:
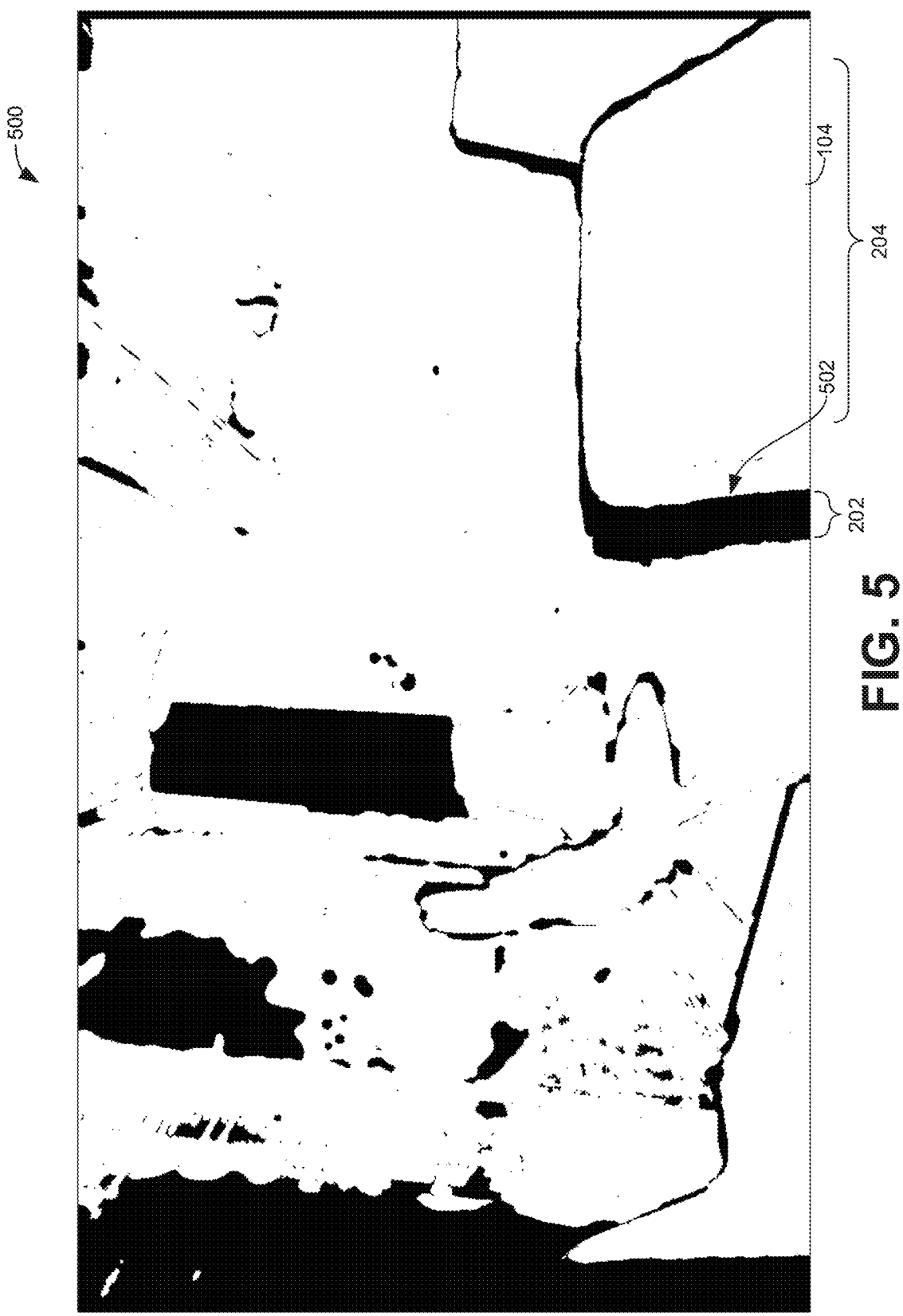
FIG. 5 is an example enhanced confidence map for the depth map of FIG. 3 generated based on the initial confidence map of FIG. 4.

Using the left image 100 of FIGS. 1 and 2 and the associated depth map 300 of FIG. 3 and initial confidence map 400 of FIG. 4 as inputs to evaluate Equation 12 results in the example confidence map 500 of FIG. 5. As apparent by comparison with FIG. 4, the confidence map 500 of FIG. 5 reduces or eliminates many of the holes or gaps in the confidence map 400 of FIG. 4 associated with low confidence regions. That is, many of the areas with relatively low confidence level in the initial confidence map 400 of FIG. 4 (e.g., in the area 204 of the facing surface of the seatback 104) have been converted to high confidence values. While this improvement is visually apparent, the improvement may be quantified by measuring a fill factor defined as the ratio or proportion of the number of values in a confidence map indicating confidence in the associated depth information relative to the total number of values in the entire confidence map. The example enhanced confidence map 500 of FIG. 5 has a higher fill factor (e.g., more values indicating confidence in the associated depth information) than the initial confidence map 400 of FIG. 4. Notably, while many holes in the initial confidence map may be removed in the enhanced confidence map (e.g., the spots of low confidence depth information are determined to have high confidence) to increase the total number of high confidence values, there are situations where pockets or spots of high confidence depth information identified by the initial confidence map are designated as having low confidence in the enhanced confidence map. This latter situations may result in a reduction in the number of values in the confidence map indicating high confidence. However, in many such situations, this is nevertheless an improvement in the accuracy of the confidence map because the values being converted to low confidence often correspond to inaccurate (e.g., false positive) depth information.

In addition to an increased number of values indicating confidence in the depth value (and a corresponding reduction in the number of holes), the discontinuities in the confidence map 500 of FIG. 5 (e.g., edges between regions of high confidence and low confidence) are more closely aligned with edges of objects represented in the image 100. For instance, the initial confidence map 400 of FIG. 4 includes an edge discontinuity 402 corresponding to the left edge 206 of the seatback 104 (corresponding to the right edge of the area 202). However, as shown in FIG. 4, the edge discontinuity 402 is relatively uneven. By contrast, the enhanced confidence map 500 of FIG. 5 includes an edge discontinuity 502 at approximately the same location as in FIG. 4. However, the edge discontinuity 502 of FIG. 5 is much smoother and more precisely aligned with the actual left edge 206 of the seatback 104 than the edge discontinuity 402 of FIG. 4.

Figure 6:
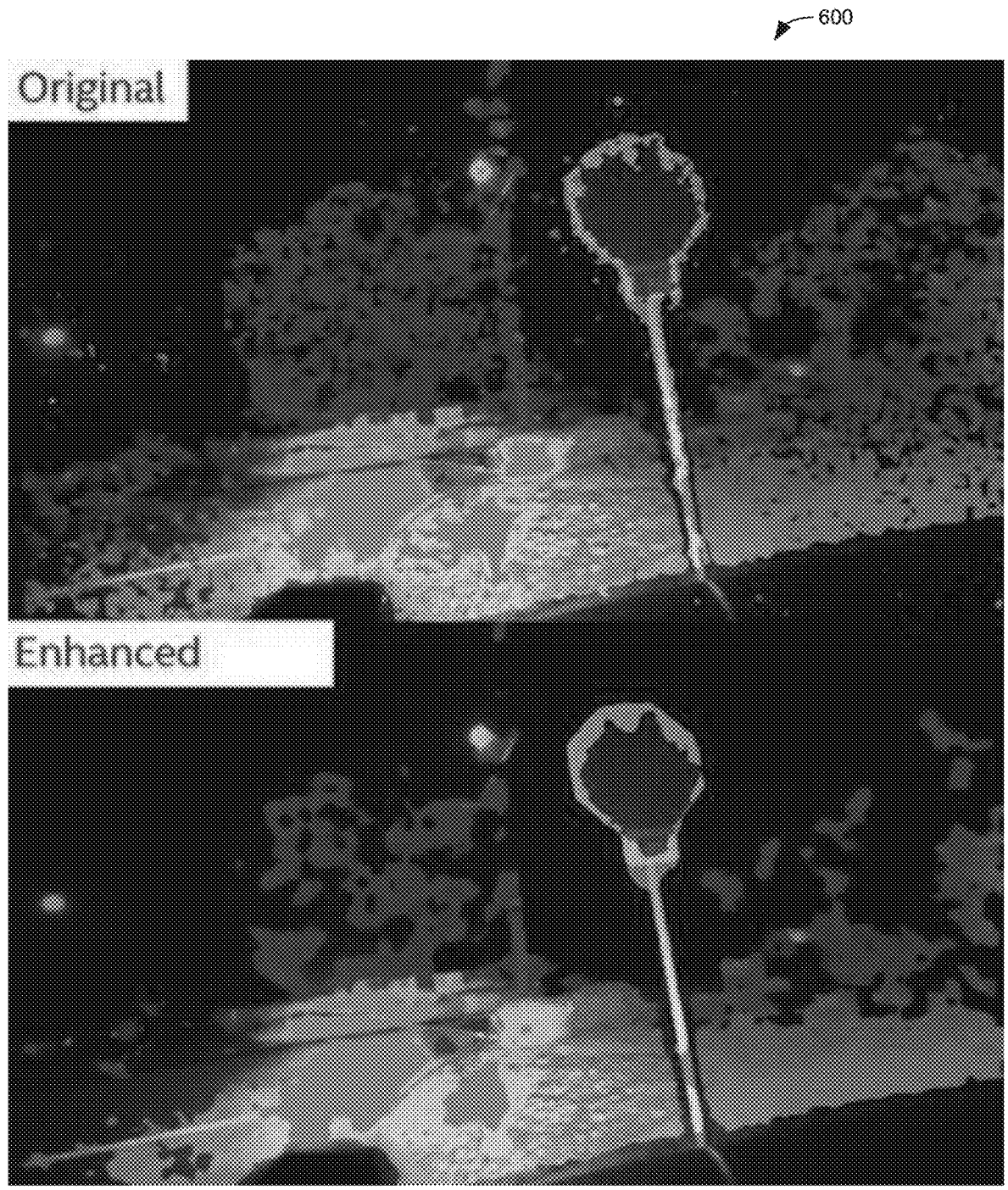
FIG. 6 is a side-by-side comparison of another example initial confidence map and an enhanced confidence map.

Improvements to the alignment of edge discontinuities in confidence maps to edges of objects in associated images of scenes is even more apparent in the example of FIG. 6. FIG. 6 includes an initial confidence map 600 and a corresponding enhanced confidence map 602 superimposed on an underlying depth map associated with an image of a scene. In this examples, the scene includes a stop sign in the foreground. The octagonal shape of the stop sign in the initial confidence map 600 is barely recognizable because there is so much uncertainty along the edges of the stop sign in the initial confidence map 600. By contrast, the octagonal shape of the stop sign in the enhanced confidence map is readily apparent because the edge discontinuities in the enhanced confidence map are more even and precisely aligned with the actual shape of the stop sign. Improvements to the alignment of edge discontinuities in confidence maps achieved in this manner is a significant improvement because it greatly facilitates object recognition and/or detection tasks commonly employed using the depth information from a depth map after filtering out the unreliable data based on the confidence map.

Figure 7:
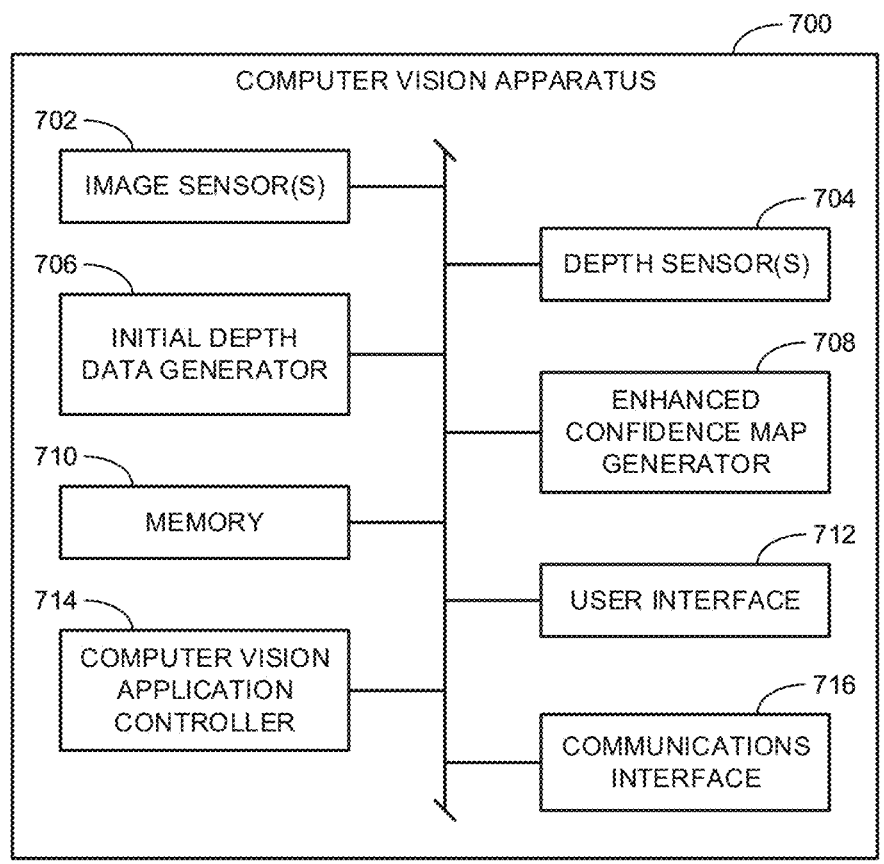
FIG. 7 is an example computer vision apparatus constructed in accordance with teachings disclosed herein.

FIG. 7 is an example computer vision apparatus 700 constructed in accordance with teachings disclosed herein. As shown in the illustrated example, the computer vision apparatus 700 includes example image sensor(s) 702, example depth sensor(s) 704, an example initial depth data generator 706, an example enhanced confidence map generator 708, example memory 710, an example user interface 712, an example computer vision application controller 714, and an example communications interface 716.

In the illustrated example of FIG. 7, the image sensor(s) 702 capture images (e.g., RGB images) of a scene to be analyzed. Thus, for example, the image sensor(s) 702 may capture the stereo images 100, 102 of FIG. 1. The example depth sensor(s) 704 capture depth information associated with images captured by the image sensor(s) 702. In some examples, the depth sensor(s) 704 may be omitted because depth information is derived from two or more stereo images, as outlined above. The example initial depth data generator 706 generates initial depth data based on one or more images and associated depth information provided by the image sensor(s) 720 and/or the depth sensor(s) 704. In some examples, the initial depth data includes both a depth map (e.g., the depth map 300 of FIG. 3) and an initial confidence map (e.g., the initial confidence map 400 of FIG. 4) corresponding to the depth map. The example initial depth data generator 706 may generate the depth map and the initial confidence map using any suitable technique.

Figure 8:
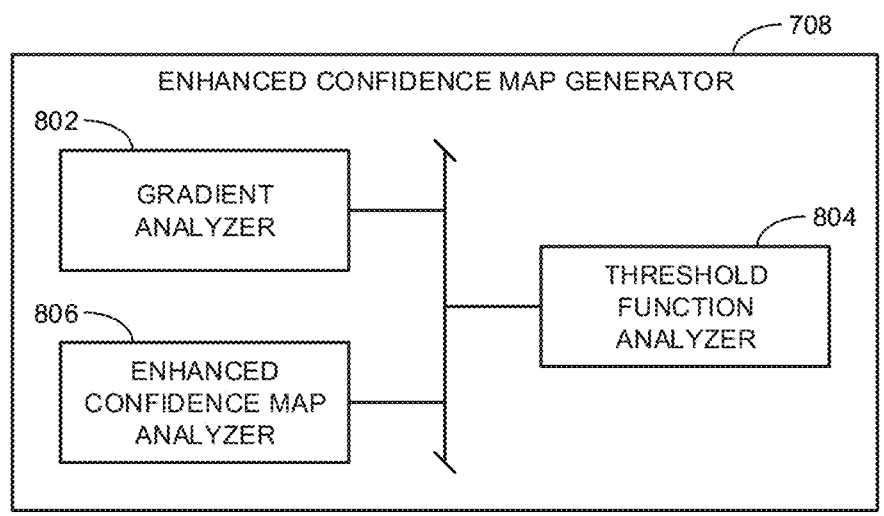
FIG. 8 is an example implementation of the enhanced confidence map generator shown in FIG. 7.

In the illustrated example of FIG. 7, the example enhanced confidence map generator 708 generates an enhanced confidence map (e.g., the enhanced confidence map 500 of FIG. 5) for the depth map generated by the initial depth data generator 706. More particularly, in some examples, the enhanced confidence map generator 708 generates the enhanced confidence map by solving for the matrix parameter $C_{out}$ that satisfies the function expressed in Equation 6. An example implementation of the enhanced confidence map generator 708 of FIG. 7 is shown in FIG. 8. In the illustrated example of FIG. 8, the enhanced confidence map generator 708 includes an example gradient analyzer 802, an example threshold function analyzer 804, and an example enhanced confidence map analyzer 806. In this example, the gradient analyzer 802 generates and/or determines the gradient for an image to be analyzed (e.g., the left image 100 of FIGS. 1 and 2) and the gradient for the depth map associated with the image (e.g., the depth map 300 of FIG. 3). The example threshold function analyzer 804 determines outputs of relevant threshold functions applied to the image gradient and the depth gradient generated by the gradient analyzer 802. With the outputs of the threshold functions applied to the image and depth gradients, all terms in Equation 12 are known or can be directly determined through matrix mathematics. Accordingly, in some examples, the enhanced confidence map analyzer 806 evaluates Equation 12 to determine $C_{out}$, which is to define the enhanced confidence map (e.g., the enhanced confidence map 500 of FIG. 5).

While the example manner of implementing the enhanced confidence map generator 708 shown and described in connection with FIG. 8 is described as involving discrete operations based on a direct evaluation of Equation 12, other implementations of the enhanced confidence map generator 708 are also possible. For instance, in some examples, the enhanced confidence map generator 708 may be implemented by and/or associated with a neural network hardware accelerator that implements a machine learning model to implicitly generate the image gradient, the depth gradient, and solve for $C_{out}$ that reduces (e.g., minimizes) the function as expressed in Equation 6. In this example, the neural network may not explicitly evaluate Equation 12. However, the learning model implemented by the neural network should, if properly trained, arrive at approximately the same result. In some examples, the neural network may produce a better result than through the analytical evaluation of Equation 12 because the neural network is trained on an entire training dataset to produce more generalized outputs, whereas the analytical approach is specific to the analysis of a single image. In some examples, such training may occur be initially evaluating Equation 12 for a set of training images to analytically solve for $C_{out}$, and then using the analytical solutions for the training images as the ground truth. Additionally or alternatively, training may occur in an unsupervised manner (e.g., without ground truth) by defining a loss function based on the minimization problem expressed in Equation 6 and then running the neural network through a set of input training images to reduce (e.g., minimize) the loss function.

In some examples, the initial depth data generator 706 and the enhanced confidence map generator 708 are integrated together and/or correspond to a single component. For example, both the initial depth data generator 706 and the enhanced confidence map generator 708 may be implemented using the same neural network hardware accelerator. In other examples, the initial depth data generator 706 and the enhanced confidence map generator 708 may be separate components. Indeed, in some examples, the initial depth data generator 706 may be implemented on a first device (along with the image sensor(s) 702 and/or the depth sensor(s) 704) that is separate from a second device implementing the enhanced confidence map generator 708.

Returning to FIG. 7, the example memory 710 serves to store information generated and/or used by any one of the image sensor(s) 702, the depth sensor(s) 704, the initial depth data generator 706, and/or the enhanced confidence map generator 708. Further, in some examples, the memory 710 stores machine learning models and/or associated parameters to implement such models to determine the enhanced confidence map using a neural network. The example user interface 712 enables a user to interface with the computer vision apparatus 700 to, for example, define values for the tunable parameters α and β of Equation 6. In some examples, user inputs provided via the example user interface 712 are also stored in the example memory 710.

The example computer vision application controller 714 implements subsequent operations associated with computer vision applications based on the outputs of the initial depth data generator 706 and/or the enhanced confidence map generator 708. For example, the computer vision application controller 714 may perform object recognition and/or detection tasks that then serve as the basis to implement a computer vision application such as size measuring, navigation, scene understanding, etc. In some examples, the operations of the computer vision application controller 714 are based on depth information contained in the depth map as filtered by the enhanced confidence map. Using the enhanced confidence map, rather than the initial confidence map, enables more accurate depth information to be used for the subsequent processing because the enhanced confidence map more accurately filters out inaccurate depth information while more accurately retaining accurate depth information. As a result, subsequent computer vision applications may be implemented with a more accurate result and/or in less time. Accuracy and processing time are significant advantages because many computer vision applications are implemented in substantially real time (e.g., navigation decisions may be made in less than 1 second from real time).

In the illustrated example of FIG. 7, the communications interface 716 enables communications with other devices and/or components associated with the computer vision apparatus. For example, if the computer vision apparatus 700 is implemented as part of an autonomous navigation system, the example communications interface 716 may provide outputs of the example computer vision application controller 714 to controllers for motors and/or other electromechanical systems that implement navigation of an associated device.

While an example manner of implementing the example computer vision apparatus 700 of FIG. 7 is illustrated in FIG. 7, one or more of the elements, processes and/or devices illustrated in FIG. 7 may be combined, divided, re-arranged, omitted, eliminated and/or implemented in any other way. Further, the example initial depth data generator 706, the example enhanced confidence map generator 708 (including, in some examples, the example gradient analyzer 802, the example threshold function analyzer 804, and the example enhanced confidence map analyzer 806), the example memory 710, the example user interface 712, the example computer vision application controller 714, the example communications interface 716 and/or, more generally, the example computer vision apparatus 700 of FIG. 7 may be implemented by hardware, software, firmware and/or any combination of hardware, software and/or firmware. Thus, for example, any of the example initial depth data generator 706, the example enhanced confidence map generator 708 (including, in some examples, the example gradient analyzer 802, the example threshold function analyzer 804, and the example enhanced confidence map analyzer 806), the example memory 710, the example user interface 712, the example computer vision application controller 714, the example communications interface 716 and/or, more generally, the example computer vision apparatus 700 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable logic device(s) (FPLD(s)), and/or hardware accelerators (e.g., a neural network accelerator). When reading any of the apparatus or system claims of this patent to cover a purely software and/or firmware implementation, at least one of the example initial depth data generator 706, the example enhanced confidence map generator 708 (including, in some examples, the example gradient analyzer 802, the example threshold function analyzer 804, and the example enhanced confidence map analyzer 806), the example memory 710, the example user interface 712, the example computer vision application controller 714, and/or the example communications interface 716 is/are hereby expressly defined to include a non-transitory computer readable storage device or storage disk such as a memory, a digital versatile disk (DVD), a compact disk (CD), a Blu-ray disk, etc. including the software and/or firmware. Further still, the example computer vision apparatus 700 of FIG. 7 may include one or more elements, processes and/or devices in addition to, or instead of, those illustrated in FIG. 7, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 9:
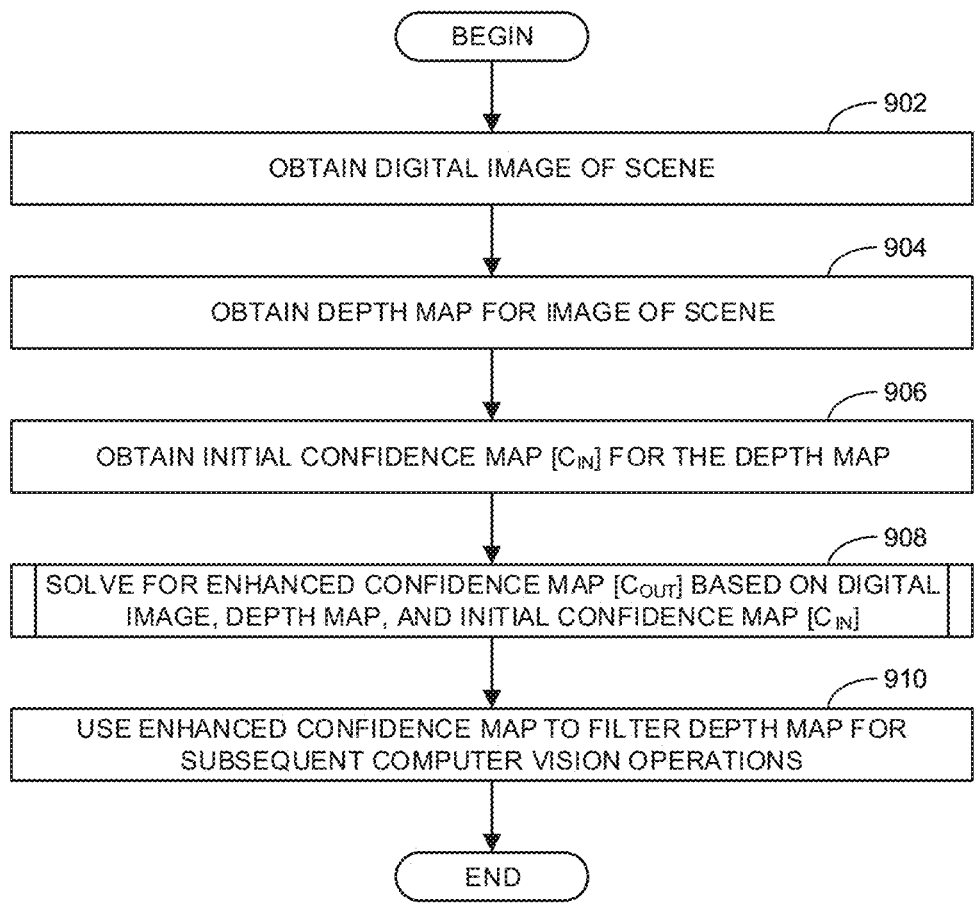
FIGS. 9 and 10 are flowcharts representative of machine readable instructions which may be executed to implement the example computer vision apparatus of FIG. 7.
Figure 10:
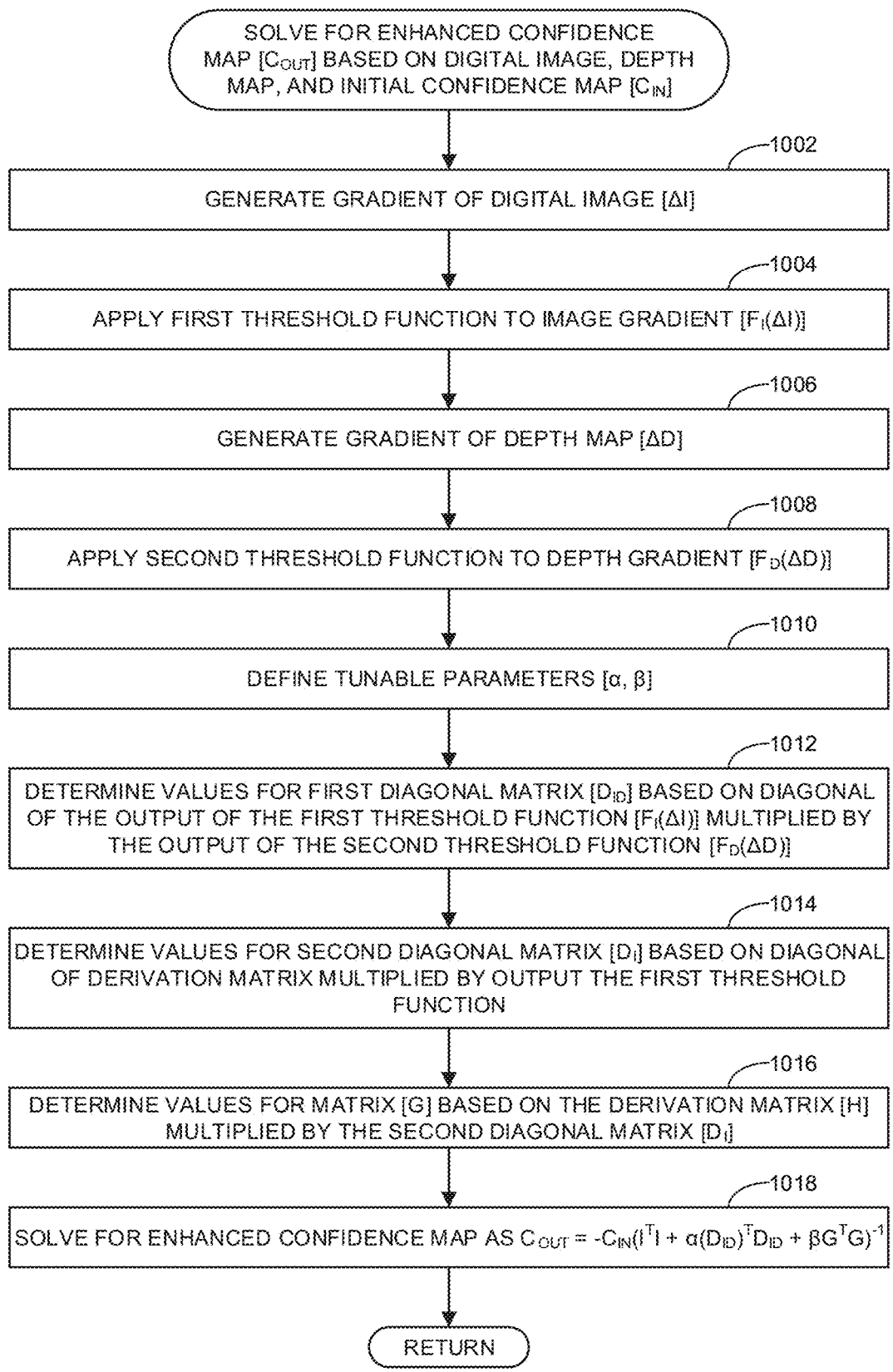

Flowcharts representative of example hardware logic, machine readable instructions, hardware implemented state machines, and/or any combination thereof for implementing the computer vision apparatus 700 of FIG. 7 is shown in FIGS. 9 and 10. The machine readable instructions may be one or more executable programs or portion(s) of an executable program for execution by a computer processor and/or processor circuitry, such as the processor 1112 shown in the example processor platform 1100 discussed below in connection with FIG. 11. The program may be embodied in software stored on a non-transitory computer readable storage medium such as a CD-ROM, a floppy disk, a hard drive, a DVD, a Blu-ray disk, or a memory associated with the processor 1112, but the entire program and/or parts thereof could alternatively be executed by a device other than the processor 1112 and/or embodied in firmware or dedicated hardware (e.g., neural network accelerator(s)). Further, although the example program is described with reference to the flowchart illustrated in FIGS. 9 and 10, many other methods of implementing the example computer vision apparatus 700 may alternatively be used. For example, the order of execution of the blocks may be changed, and/or some of the blocks described may be changed, eliminated, or combined. Further, in some examples, one or more of the operations represented by individual ones of the blocks in FIGS. 9 and 10 may be implicitly performed based on the implementation of machine learning model. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 9 and 10 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The program of FIG. 9 begins at block 902 where the example computer vision apparatus 700 obtains a digital image of a scene (e.g., the left image 100 of FIGS. 1 and 2). In some examples, the digital image is captured and/or provided by the image sensor(s) 702. At block 904, the example computer vision apparatus 700 obtains a depth map (e.g., the example depth map 300 of FIG. 3) for the image. In some examples, the depth map is generated and/or provided by the depth sensor(s) 704. Additionally or alternatively, in some examples, the depth map is generated and/or provided by the initial depth data generator 706 based on the image. At block 906, the example computer vision apparatus 700 obtains an initial confidence map (e.g., the initial confidence map 400 of FIG. 4) for the depth map. At block 908, the example enhanced confidence map generator 708 solves for an enhanced confidence map (e.g., the enhanced confidence map 500 of FIG. 5) based on the digital image, the depth map, and the initial confidence map. An example process for implementing block 908 is provided below in connection with FIG. 10. At block 910, the example computer vision application controller 714 uses the enhanced confidence map to filter the depth map for subsequent computer visions operations. Thereafter, the example process of FIG. 9 ends.

As mentioned above, FIG. 10 is a flowchart illustrating an example implementation for block 908 of FIG. 9. The flowchart of FIG. 10 may be representative of machine readable instructions corresponding to one or more executable programs or portion(s) of an executable program for execution by a computer processor and/or processor circuitry. Thus, the flowchart of FIG. 10 defines sequential logic that may be implemented to solve for the enhanced confidence map. However, the separate functions and/or operations represented by the different blocks in the flowchart of FIG. 10 need not follow a sequential path or be explicitly implemented. Rather, the flowchart of FIG. 10 may alternatively be representative of implicit operations accomplished internally by a machine learning model implemented by a neural network and its associated hardware. Further, in such examples, while one or more of the blocks of FIG. 10 may only be implicitly implemented, one or more other ones of the blocks of FIG. 10 and/or the operations they represent may be omitted entirely and/or replaced with different operations not represented in the illustrated example.

Turning in detail to the figure, the example process of FIG. 10 begins at block 1002 where the example enhanced confidence map generator 708 generates a gradient of the digital image. In some examples, the image gradient is generated by the example gradient analyzer 802. At block 1004, the example enhanced confidence map generator 708 applies a first threshold function to the image gradient. In some examples, the first threshold function is a monotonic decreasing soft threshold function. In some examples, the first threshold function is applied by the example threshold function analyzer 804. At block 1006, the example enhanced confidence map generator 708 generates a gradient of the depth map. In some examples, the depth gradient is generated by the example gradient analyzer 802. At block 1008, the example enhanced confidence map generator 708 applies a second threshold function to the depth gradient. In some examples, the second threshold function is a monotonic increasing soft threshold function. In some examples, the second threshold function is applied by the example threshold function analyzer 804.

At block 1010, the example enhanced confidence map generator 708 defines tunable parameters. In some examples, the tunable parameters are defined based on user inputs received via the user interface 712. At block 1012, the example enhanced confidence map generator 708 determines values for a first diagonal matrix based on the diagonal of the output of the first threshold function (generated at block 1004) multiplied by the output of the second input function (generated at block 1008). At block 1014, the example enhanced confidence map generator 708 determines values for a second diagonal matrix based on the diagonal of the output of the first threshold function (generated at block 1004). At block 1016, the example enhanced confidence map generator 708 determines values for a matrix based on the derivation matrix (e.g., defined by Equation 10) multiplied by the second diagonal matrix (generated at block 1014). At block 1018, the example enhanced confidence map generator 708 solves for the enhanced map by evaluating Equation 12. In this example, the values for $C_{in}$, are defined by the initial confidence map obtained at block 906 of FIG. 9. However, in some examples, the initial confidence map may be ignored and all values in $C_{in}$, may be set to 1. In some examples, the computations of blocks 1012-1018 are implemented by the example enhanced confidence map analyzer 806 of FIG. 8. Once the enhanced confidence map has been solved for, the example process of FIG. 10 ends and returns to complete the process of FIG. 9.

Figure 11:
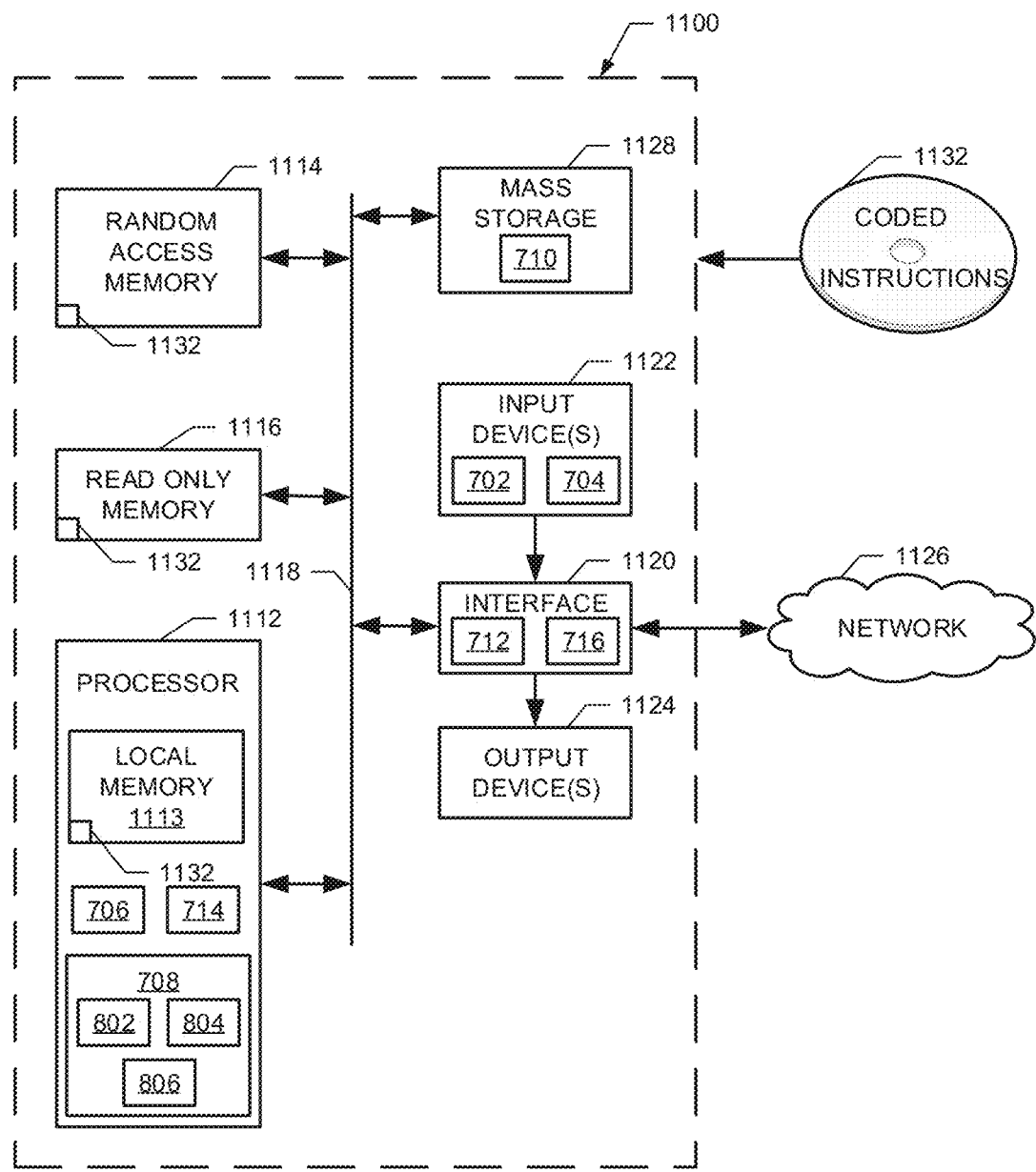
FIG. 11 is a block diagram of an example processing platform structured to execute the instructions of FIGS. 9 and/or 10 to implement the example computer vision apparatus of FIG. 7.

FIG. 11 is a block diagram of an example processor platform 1100 structured to execute the instructions of FIGS. 9 and/or 10 to implement the computer vision apparatus 700 of FIG. 7. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example initial depth data generator 706, the example enhanced confidence map generator 708 (including the example gradient analyzer 802, the example threshold function analyzer 804, and the example enhanced confidence map analyzer 806), and the example communications interface 716.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), a Bluetooth® interface, a near field communication (NFC) interface, and/or a PCI express interface.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and digital versatile disk (DVD) drives.

The machine executable instructions 1132 of FIGS. 9 and/or 10 may be stored in the mass storage device 1128, in the volatile memory 1114, in the non-volatile memory 1116, and/or on a removable non-transitory computer readable storage medium such as a CD or DVD.

From the foregoing, it will be appreciated that example methods, systems, apparatus and articles of manufacture have been disclosed that enable the generation of enhanced or refined confidence maps to filter depth information in associated depth maps more accurately for improved computer vision applications. Examples disclosed herein generate the enhanced confidence maps based on confidence maps previously generated using any suitable technique. While many existing techniques for confidence map generation depend upon cost volumes, examples disclosed herein generate the enhanced confidence maps based on these initial confidence maps without using such cost volumes. This is a significant improvement because cost volume data is often not available and would require significant amounts of process and/or memory capacity because of its size. Therefore, implementing examples disclosed herein provides an improved confidence map while at the same time avoiding significant memory and/or processor burdens. Thus, disclosed methods, apparatus and articles of manufacture improve the efficiency of using a computing device.

Example methods, apparatus, systems, and articles of manufacture to enhance image depth confidence maps are disclosed herein. Further examples and combinations thereof include the following:

Example 1 includes an apparatus comprising a gradient analyzer to generate an image gradient based on a digital image of a scene, and generate a depth gradient based on a depth map associated with the digital image, the depth map to define depth values corresponding to pixels in the digital image, and an enhanced confidence map analyzer to determine an enhanced confidence map for the depth map based on the image gradient, the depth gradient, and an initial confidence map for the depth map.

Example 2 includes the apparatus of example 1, wherein the enhanced confidence map analyzer is to define first confidence values included in the enhanced confidence map, the first confidence values indicative of first confidence levels for the depth values in the depth map, the initial confidence map to include second confidence values indicative of second confidence levels for the depth values in the depth map, a first set of the first confidence values to satisfy a first threshold, a second set of the second confidence values to satisfy the first threshold, the first set of confidence values corresponding to a first set of the depth values, the second set of confidence values corresponding to a second set of the depth values, the first set of depth values more accurately representing depths of surfaces in the scene than the second set of depth values.

Example 3 includes the apparatus of example 2, wherein the first set of confidence values is to include a first number of confidence values and the second set of confidence values is to include a second number of confidence values, the first number greater than the second number.

Example 4 includes the apparatus of any one of examples 2 and 3, wherein the second set of confidence values are to be positioned throughout the initial confidence map in a manner that results in a plurality of holes associated with a third set of the second confidence values, the second set of confidence values excluding the third set of confidence values, the enhanced confidence map analyzer to define ones of the first confidence values in the first set of confidence values corresponding to ones of the second confidence values in the third set of confidence values.

Example 5 includes the apparatus of any one of examples 2-4, wherein the first set of depth values are to correspond to a first placement of pixels in the digital image and the second set of depth values are to correspond to a second placement of pixels in the digital image, the first placement of pixels more aligned with edges of objects in the scene represented in the digital image than the second placement of pixels.

Example 6 includes the apparatus of any one of examples 1-5, wherein the enhanced confidence map analyzer is to determine the enhanced confidence map without processing a cost volume associated with the depth map.

Example 7 includes the apparatus of any one of examples 1-6, wherein the enhanced confidence map corresponds to values of a matrix parameter that reduces a function of the matrix parameter.

Example 8 includes the apparatus of example 7, wherein the function is based on a Euclidean norm of a difference between the initial confidence map and the matrix parameter.

Example 9 includes the apparatus of any one of examples 7 and 8, wherein the function approaches a minimum as the matrix parameter approaches the initial confidence map.

Example 10 includes the apparatus of any one of examples 7-9, wherein the function is based on a Euclidean norm of the matrix parameter multiplied by (1) a first output of a first threshold function applied to the image gradient and (2) a second output of a second threshold function applied to the depth gradient.

Example 11 includes the apparatus of example 10, wherein the first threshold function is a monotonic decreasing threshold function and the second threshold function is a monotonic increasing threshold function.

Example 12 includes the apparatus of any one of examples 7-11, wherein the function approaches a minimum as first values of the matrix parameter are reduced, the first values corresponding to regions in the digital image and the depth map associated with (1) outputs of the image gradient below a first threshold and (2) outputs of the depth gradient above a second threshold.

Example 13 includes the apparatus of any one of examples 7-12, wherein the function is based on a Euclidean norm of a gradient of the matrix parameter multiplied by an output of a threshold function applied to the image gradient.

Example 14 includes the apparatus of any one of examples 7-13, wherein the function approaches a minimum when a discontinuity between adjacent values in the matrix parameter align with an edge of an object in the scene represented in the digital image, the edge in the digital image identified by the image gradient.

Example 15 includes a non-transitory computer readable medium comprising instructions that, when executed, causes a machine to at least generate an image gradient based on a digital image of a scene, generate a depth gradient based on a depth map associated with the digital image, the depth map to define depth values corresponding to pixels in the digital image, and determine an enhanced confidence map for the depth map based on the image gradient, the depth gradient, and an initial confidence map for the depth map.

Example 16 includes the non-transitory computer readable medium of example 15, wherein the instructions further cause the machine to define first confidence values included in the enhanced confidence map, the first confidence values indicative of first confidence levels for the depth values in the depth map, the initial confidence map to include second confidence values indicative of second confidence levels for the depth values in the depth map, a first set of the first confidence values to satisfy a first threshold, a second set of the second confidence values to satisfy the first threshold, the first set of confidence values corresponding to a first set of the depth values, the second set of confidence values corresponding to a second set of the depth values, the first set of depth values more accurately representing depths of surfaces in the scene than the second set of depth values.

Example 17 includes the non-transitory computer readable medium of example 16, wherein the first set of confidence values is to include a first number of confidence values and the second set of confidence values is to include a second number of confidence values, the first number greater than the second number.

Example 18 includes the non-transitory computer readable medium of any one of examples 16 and 17, wherein the second set of confidence values are to be positioned throughout the initial confidence map in a manner that results in a plurality of holes associated with a third set of the second confidence values, the second set of confidence values excluding the third set of confidence values, wherein the instructions further cause the machine to define ones of the first confidence values in the first set of confidence values corresponding to ones of the second confidence values in the third set of confidence values.

Example 19 includes the non-transitory computer readable medium of any one of examples 16-18, wherein the first set of depth values are to correspond to a first placement of pixels in the digital image and the second set of depth values are to correspond to a second placement of pixels in the digital image, the first placement of pixels more aligned with edges of objects in the scene represented in the digital image than the second placement of pixels.

Example 20 includes the non-transitory computer readable medium of any one of examples 15-19, wherein the instructions further cause the machine to determine the enhanced confidence map without processing a cost volume associated with the depth map.

Example 21 includes the non-transitory computer readable medium of any one of examples 15-20, wherein the enhanced confidence map corresponds to values of a matrix parameter that reduces a function of the matrix parameter.

Example 22 includes the non-transitory computer readable medium of example 21, wherein the function is based on a Euclidean norm of a difference between the initial confidence map and the matrix parameter.

Example 23 includes the non-transitory computer readable medium of any one of examples 21 and 22, wherein the function approaches a minimum as the matrix parameter approaches the initial confidence map.

Example 24 includes the non-transitory computer readable medium of any one of examples 21-23, wherein the function is based on a Euclidean norm of the matrix parameter multiplied by (1) a first output of a first threshold function applied to the image gradient and (2) a second output of a second threshold function applied to the depth gradient.

Example 25 includes the non-transitory computer readable medium of example 24, wherein the first threshold function is a monotonic decreasing threshold function and the second threshold function is a monotonic increasing threshold function.

Example 26 includes the non-transitory computer readable medium of any one of examples 21-25, wherein the function approaches a minimum as first values of the matrix parameter are reduced, the first values corresponding to regions in the digital image and the depth map associated with (1) outputs of the image gradient below a first threshold and (2) outputs of the depth gradient above a second threshold.

Example 27 includes the non-transitory computer readable medium of any one of examples 21-26, wherein the function is based on a Euclidean norm of a gradient of the matrix parameter multiplied by an output of a threshold function applied to the image gradient.

Example 28 includes the non-transitory computer readable medium of any one of examples 21-27, wherein the function approaches a minimum when a discontinuity between adjacent values in the matrix parameter align with an edge of an object in the scene represented in the digital image, the edge in the digital image identified by the image gradient.

Example 29 includes a method comprising generating, by executing an instruction with a logic circuit, an image gradient based on a digital image of a scene, generating, by executing an instruction with the logic circuit, a depth gradient based on a depth map associated with the digital image, the depth map to define depth values corresponding to pixels in the digital image, and determining, by executing an instruction with the logic circuit, an enhanced confidence map for the depth map based on the image gradient, the depth gradient, and an initial confidence map for the depth map.

Example 30 includes the method of example 29, further including defining first confidence values included in the enhanced confidence map, the first confidence values indicative of first confidence levels for the depth values in the depth map, the initial confidence map to include second confidence values indicative of second confidence levels for the depth values in the depth map, a first set of the first confidence values to satisfy a first threshold, a second set of the second confidence values to satisfy the first threshold, the first set of confidence values corresponding to a first set of the depth values, the second set of confidence values corresponding to a second set of the depth values, the first set of depth values more accurately representing depths of surfaces in the scene than the second set of depth values.

Example 31 includes the method of example 30, wherein the first set of confidence values is to include a first number of confidence values and the second set of confidence values is to include a second number of confidence values, the first number greater than the second number.

Example 32 includes the method of any one of examples 30 and 31, wherein the second set of confidence values are to be positioned throughout the initial confidence map in a manner that results in a plurality of holes associated with a third set of the second confidence values, the second set of confidence values excluding the third set of confidence values, the method further including defining ones of the first confidence values in the first set of confidence values corresponding to ones of the second confidence values in the third set of confidence values.

Example 33 includes the method of any one of examples 30-32, wherein the first set of depth values are to correspond to a first placement of pixels in the digital image and the second set of depth values are to correspond to a second placement of pixels in the digital image, the first placement of pixels more aligned with edges of objects in the scene represented in the digital image than the second placement of pixels.

Example 34 includes the method of any one of examples 29-33, further including determining the enhanced confidence map without processing a cost volume associated with the depth map.

Example 35 includes the method of any one of examples 29-34, wherein the enhanced confidence map corresponds to values of a matrix parameter that reduces a function of the matrix parameter.

Example 36 includes the method of example 35, wherein the function is based on a Euclidean norm of a difference between the initial confidence map and the matrix parameter.

Example 37 includes the method of any one of examples 35 and 36, wherein the function approaches a minimum as the matrix parameter approaches the initial confidence map.

Example 38 includes the method of any one of examples 35-37, wherein the function is based on a Euclidean norm of the matrix parameter multiplied by (1) a first output of a first threshold function applied to the image gradient and (2) a second output of a second threshold function applied to the depth gradient.

Example 39 includes the method of example 38, wherein the first threshold function is a monotonic decreasing threshold function and the second threshold function is a monotonic increasing threshold function.

Example 40 includes the method of any one of examples 35-39, wherein the function approaches a minimum as first values of the matrix parameter are reduced, the first values corresponding to regions in the digital image and the depth map associated with (1) outputs of the image gradient below a first threshold and (2) outputs of the depth gradient above a second threshold.

Example 41 includes the method of any one of examples 35-40, wherein the function is based on a Euclidean norm of a gradient of the matrix parameter multiplied by an output of a threshold function applied to the image gradient.

Example 42 includes the method of any one of examples 35-41, wherein the function approaches a minimum when a discontinuity between adjacent values in the matrix parameter align with an edge of an object in the scene represented in the digital image, the edge in the digital image identified by the image gradient.

Example 43 includes the method of any one of examples 29-42, wherein the logic circuit is a processor.

Example 44 includes the method of any one of examples 29-43, wherein the logic circuit is a neural network hardware accelerator.

Example 45 includes an apparatus comprising means for generating gradients to generate an image gradient based on a digital image of a scene, and generate a depth gradient based on a depth map associated with the digital image, the depth map to define depth values corresponding to pixels in the digital image, and means for generating an enhanced confidence map for the depth map based on the image gradient, the depth gradient, and an initial confidence map for the depth map.

Example 46 includes the apparatus of example 45, wherein the means for generating the enhanced confidence map is to define first confidence values included in the enhanced confidence map, the first confidence values indicative of first confidence levels for the depth values in the depth map, the initial confidence map to include second confidence values indicative of second confidence levels for the depth values in the depth map, a first set of the first confidence values to satisfy a first threshold, a second set of the second confidence values to satisfy the first threshold, the first set of confidence values corresponding to a first set of the depth values, the second set of confidence values corresponding to a second set of the depth values, the first set of depth values more accurately representing depths of surfaces in the scene than the second set of depth values.

Example 47 includes the apparatus of example 46, wherein the first set of confidence values is to include a first number of confidence values and the second set of confidence values is to include a second number of confidence values, the first number greater than the second number.

Example 48 includes the apparatus of any one of examples 46 and 47, wherein the second set of confidence values are to be positioned throughout the initial confidence map in a manner that results in a plurality of holes associated with a third set of the second confidence values, the second set of confidence values excluding the third set of confidence values, wherein the means for generating the enhanced confidence map is to define ones of the first confidence values in the first set of confidence values corresponding to ones of the second confidence values in the third set of confidence values.

Example 49 includes the apparatus of any one of examples 46-48, wherein the first set of depth values are to correspond to a first placement of pixels in the digital image and the second set of depth values are to correspond to a second placement of pixels in the digital image, the first placement of pixels more aligned with edges of objects in the scene represented in the digital image than the second placement of pixels.

Example 50 includes the apparatus of any one of examples 45-49, wherein the means for generating the enhanced confidence map is to determine the enhanced confidence map without processing a cost volume associated with the depth map.

Example 51 includes the apparatus of any one of examples 45-50, wherein the enhanced confidence map corresponds to values of a matrix parameter that reduces a function of the matrix parameter.

Example 52 includes the apparatus of example 51, wherein the function is based on a Euclidean norm of a difference between the initial confidence map and the matrix parameter.

Example 53 includes the apparatus of any one of examples 51 and 52, wherein the function approaches a minimum as the matrix parameter approaches the initial confidence map.

Example 54 includes the apparatus of any one of examples 51-53, wherein the function is based on a Euclidean norm of the matrix parameter multiplied by (1) a first output of a first threshold function applied to the image gradient and (2) a second output of a second threshold function applied to the depth gradient.

Example 55 includes the apparatus of example 54, wherein the first threshold function is a monotonic decreasing threshold function and the second threshold function is a monotonic increasing threshold function.

Example 56 includes the apparatus of any one of examples 51-55, wherein the function approaches a minimum as first values of the matrix parameter are reduced, the first values corresponding to regions in the digital image and the depth map associated with (1) outputs of the image gradient below a first threshold and (2) outputs of the depth gradient above a second threshold.

Example 57 includes the apparatus of any one of examples 51-56, wherein the function is based on a Euclidean norm of a gradient of the matrix parameter multiplied by an output of a threshold function applied to the image gradient.

Example 58 includes the apparatus of any one of examples 51-57, wherein the function approaches a minimum when a discontinuity between adjacent values in the matrix parameter align with an edge of an object in the scene represented in the digital image, the edge in the digital image identified by the image gradient.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   a gradient analyzer to:
      generate an image gradient based on a digital image of a scene; and
      generate a depth gradient based on a depth map associated with the digital image, the depth map to define depth values corresponding to pixels in the digital image; and an enhanced confidence map analyzer to determine an enhanced confidence map for the depth map based on the image gradient, the depth gradient, and an initial confidence map for the depth map, the enhanced confidence map including first confidence values indicative of first confidence levels for the depth values in the depth map, the initial confidence map including second confidence values indicative of second confidence levels for the depth values in the depth map, a first set of the first confidence values corresponding to a first set of the depth values, a second set of the second confidence values corresponding to a second set of the depth values, the first set of the depth values more accurately representing depths of surfaces in the scene than the second set of the depth values.

2. The apparatus of claim 1, wherein the first set of the first confidence values satisfy a threshold, and the second set of the second confidence values satisfy the threshold.

3. The apparatus of claim 1, wherein the first set of the first confidence values is to include a first number of confidence values and the second set of the second confidence values is to include a second number of confidence values, the first number greater than the second number.

4. The apparatus of claim 1, wherein ones of the second set of the second confidence values are to be positioned throughout the initial confidence map in a manner that results in a plurality of holes associated with a third set of the second confidence values, the second set of the second confidence values excluding the third set of the second confidence values, the enhanced confidence map analyzer to define ones of the first confidence values in the first set of the first confidence values corresponding to ones of the second confidence values in the third set of the second confidence values.

5. The apparatus of claim 1, wherein ones of the first set of the depth values are to correspond to a first placement of pixels in the digital image and ones of the second set of the depth values are to correspond to a second placement of pixels in the digital image, the first placement of pixels more aligned with edges of objects in the scene represented in the digital image than the second placement of pixels.

6. The apparatus of claim 1, wherein the enhanced confidence map analyzer is to determine the enhanced confidence map without processing a cost volume associated with the depth map.

7. The apparatus of claim 1, wherein the enhanced confidence map corresponds to values of a matrix parameter that reduces a function of the matrix parameter.

8. The apparatus of claim 7, wherein the function is based on a Euclidean norm of a difference between the initial confidence map and the matrix parameter.

9. The apparatus of claim 7, wherein the function approaches a minimum as the matrix parameter approaches the initial confidence map.

10. The apparatus of claim 7, wherein the function is based on a Euclidean norm of the matrix parameter multiplied by (1) a first output of a first threshold function applied to the image gradient and (2) a second output of a second threshold function applied to the depth gradient.

11. The apparatus of claim 10, wherein the first threshold function is a monotonic decreasing threshold function and the second threshold function is a monotonic increasing threshold function.

12. The apparatus of claim 7, wherein the function approaches a minimum as first values of the matrix parameter are reduced, the first values corresponding to regions in the digital image and the depth map associated with (1) outputs of the image gradient below a first threshold and (2) outputs of the depth gradient above a second threshold.

13. The apparatus of claim 7, wherein the function is based on a Euclidean norm of a gradient of the matrix parameter multiplied by an output of a threshold function applied to the image gradient.

14. The apparatus of claim 7, wherein the function approaches a minimum when a discontinuity between adjacent values in the matrix parameter align with an edge of an object in the scene represented in the digital image, the edge in the digital image identified by the image gradient.

15. A non-transitory computer readable medium comprising instructions that, when executed, causes a machine to at least:
generate an image gradient based on a digital image of a scene;
generate a depth gradient based on a depth map associated with the digital image, the depth map to define depth values corresponding to pixels in the digital image; and
determine an enhanced confidence map for the depth map based on the image gradient, the depth gradient, and an initial confidence map for the depth map, the enhanced confidence map including first confidence values indicative of first confidence levels for the depth values in the depth map, the initial confidence map including second confidence values indicative of second confidence levels for the depth values in the depth map, a first set of the first confidence values corresponding to a first set of the depth values, a second set of the second confidence values corresponding to a second set of the depth values, the first set of the depth values more accurately representing depths of surfaces in the scene than the second set of the depth values.

16. The non-transitory computer readable medium of claim 15, wherein the first set of the first confidence values satisfy a threshold, and the second set of the second confidence values satisfy the threshold.

17. The non-transitory computer readable medium of claim 15, wherein the instructions further cause the machine to determine the enhanced confidence map without processing a cost volume associated with the depth map.

18. The non-transitory computer readable medium of claim 15, wherein the enhanced confidence map corresponds to values of a matrix parameter that reduces a function of the matrix parameter.

19. The non-transitory computer readable medium of claim 15, wherein ones of the second set of the second confidence values are to be positioned throughout the initial confidence map in a manner that results in a plurality of holes associated with a third set of the second confidence values, the second set of the second confidence values excluding the third set of the second confidence values, wherein the instructions further cause the machine to define ones of the first confidence values in the first set of the first confidence values corresponding to ones of the second confidence, values in the third set of the second confidence values.

20. A method comprising:
generating, by executing an instruction with a logic circuit, an image gradient based on a digital image of a scene;
generating, by executing an instruction with the logic circuit, a depth gradient based on a depth map associated with the digital image, the depth map to define depth values corresponding to pixels in the digital image; and determining, by executing an instruction with the logic circuit, an enhanced confidence map for the depth map based on the image gradient, the depth gradient, and an initial confidence map for the depth map, the enhanced confidence map including first confidence values indicative of first confidence levels for the depth values in the depth map, the initial confidence map including second confidence values indicative of second confidence levels for the depth values in the depth map, a first set of the first confidence values corresponding to a first set of the depth values, a second set of the second confidence values corresponding to a second set of the depth values, the first set of the depth values more accurately representing depths of surfaces in the scene than the second set of the depth values.

21. The method of claim 20, wherein the first set of the first confidence values satisfy a threshold, and the second set of the second confidence values satisfy the threshold.

22. The method of claim 20, wherein the logic circuit is a processor.

23. The method of claim 20, wherein the logic circuit is a neural network hardware accelerator.

24. An apparatus comprising:
means for generating gradients to:
generate an image gradient based on a digital image of a scene; and
generate a depth gradient based on a depth map associated with the digital image, the depth map to define depth values corresponding to pixels in the digital image; and
means for generating an enhanced confidence map for the depth map based on the image gradient, the depth gradient, and an initial confidence map for the depth map, the enhanced confidence map including first confidence values indicative of first confidence levels for the depth values in the depth map, the initial confidence map including second confidence values indicative of second confidence levels for the depth values in the depth map, a first set of the first confidence values corresponding to a first set of the depth values, a second set of the second confidence values corresponding to a second set of the depth values, the first set of the depth values more accurately representing depths of surfaces in the scene than the second set of the depth values.

25. The apparatus of claim 24, wherein the first set of the first confidence values satisfy a threshold, and the second set of the second confidence values satisfy the threshold.

26. The apparatus of claim 24, wherein the means for generating the enhanced confidence map is to determine the enhanced confidence map without processing a cost volume associated with the depth map.

27. An apparatus comprising:
at least one memory;
instructions in the apparatus:
processor circuitry to execute the instructions to:
generate an image gradient based on a digital image of a scene; and
generate a depth gradient based on a depth map associated with the digital image, the depth map to define depth values corresponding to pixels in the digital image; and
determine an enhanced confidence map for the depth map based on the image gradient, the depth gradient, and an initial confidence map for the depth map, the enhanced confidence map including first confidence values indicative of first confidence levels for the depth values in the depth map, the initial confidence map including second confidence values indicative of second confidence levels for the depth values in the depth map, a first set of the first confidence values corresponding to a first set of the depth values, a second set of the second confidence values corresponding to a second set of the depth values, the first set of the depth values more accurately representing depths of surfaces in the scene than the second set of the depth values.

28. The apparatus of claim 27, wherein the first set of the first confidence values is to include a first number of confidence values and the second set of the second confidence values is to include a second number of confidence values, the first number greater than the second number.

29. The apparatus of claim 27, wherein ones of the second set of the second confidence values are to be positioned throughout the initial confidence map in a manner that results in a plurality of holes associated with a third set of the second confidence values, the second set of the second confidence values excluding the third set of the second confidence values, the processor circuitry to define ones of the first confidence values in the first set of the first confidence values corresponding to ones of the second confidence values in the third set of the second confidence values.

30. The apparatus of claim 27, wherein ones of the first set of the depth values are to correspond to a first placement of pixels in the digital image and ones of the second set of the depth values are to correspond to a second placement of pixels in the digital image, the first placement of pixels more aligned with edges of objects in the scene represented in the digital image than the second placement of pixels.

31. The apparatus of claim 27, wherein the enhanced confidence map corresponds to values of a matrix parameter that reduces a function of the matrix parameter.

32. The apparatus of claim 31, wherein the function is based on a Euclidean norm of a difference between the initial confidence map and the matrix parameter.

33. The apparatus of claim 31, wherein the function is based on a Euclidean norm of the matrix parameter multiplied by (1) a first output of a first threshold function applied to the image gradient and (2) a second output of a second threshold function applied to the depth gradient.

34. The apparatus of claim 31, wherein the function approaches a minimum as first values of the matrix parameter are reduced, the first values corresponding to regions in the digital image and the depth map associated with (1) outputs of the image gradient below a first threshold and (2) outputs of the depth gradient above a second threshold.

35. The apparatus of claim 31, wherein the function is based on a Euclidean norm of a gradient of the matrix parameter multiplied by an output of a threshold function applied to the image gradient.

36. The apparatus of claim 31, wherein the function approaches a minimum when a discontinuity between adjacent values in the matrix parameter align with an edge of an object in the scene represented in the digital image, the edge in the digital image identified by the image gradient.

* * * * *